United States Patent
Berlotserkovsky et al.

(10) Patent No.: US 8,774,293 B2
(45) Date of Patent: Jul. 8, 2014

(54) METHOD AND APPARATUS FOR DETERMINING CHANNELS IN A SIGNAL

(75) Inventors: Maxim Berlotserkovsky, Carmel, IN (US); Aaron Reel Bouillet, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 335 days.

(21) Appl. No.: 12/736,999

(22) PCT Filed: Jun. 3, 2009

(86) PCT No.: PCT/US2009/046053
§ 371 (c)(1),
(2), (4) Date: Nov. 30, 2010

(87) PCT Pub. No.: WO2010/047852
PCT Pub. Date: Apr. 29, 2010

(65) Prior Publication Data
US 2011/0069747 A1    Mar. 24, 2011

Related U.S. Application Data

(60) Provisional application No. 61/130,950, filed on Jun. 3, 2008.

(51) Int. Cl.
*H04L 27/28* (2006.01)
*H04L 27/26* (2006.01)
*H04L 27/00* (2006.01)
*H04B 1/00* (2006.01)
*H04H 60/41* (2008.01)

(52) U.S. Cl.
CPC ........ *H04L 27/0014* (2013.01); *H04L 27/2647* (2013.01); *H04B 1/0003* (2013.01); *H04H 60/41* (2013.01); *H04L 27/2666* (2013.01)
USPC .......................................... 375/260; 375/225

(58) Field of Classification Search
USPC .......................................... 375/260, 343, 344
See application file for complete search history.

(56) References Cited

U.S. PATENT DOCUMENTS 5,090,027 A   2/1992  Ohsawa
5,636,250 A   6/1997  Scarpa (Continued)

FOREIGN PATENT DOCUMENTS

KR   102007-31466   3/2007
WO   WO 99/05815    2/1999

OTHER PUBLICATIONS

Davila, Carlos E., et al. "Steady-State VEP Estimation by Adaptive Line Enhancement" Engineering in Medicine and Biology Society, 1993. Proceedings of the 15th Annual International Conference of the IEEE, Oct. 28-31, 1993, Piscataway, NJ, USA, IEEE, Oct. 28, 1993, pp. 448-449, XP010574396.

(Continued)

*Primary Examiner* — Shuwang Liu
*Assistant Examiner* — Helene Tayong
(74) *Attorney, Agent, or Firm* — Robert D. Shedd; Vincent E. Duffy; Michael A. Pugel

(57) ABSTRACT

The determination and identification of channels in a signal is an important aspect of the operation of a signal receiver. A method (800) is described including the steps receiving (802) a signal containing a plurality of channels, filtering (806) the signal to produce an indicator of a channel band edge, and determining (818) a characteristic of the channel based on the indicator. Additionally, an apparatus (300) is described including a spectrum shift circuit (304) that receives an input signal and shifts the frequency spectrum of the signal, a filter (306) that filters the frequency shifted signal to produce an indicator of a band edge of a channel, and a signal analysis circuit (316, 318) that determines a characteristic of the channel based on the indicator of the band edge, the signal analysis circuit (316, 318) controlling the frequency shift in the spectrum shift circuit (304) based on the determined characteristic of the channel.

16 Claims, 8 Drawing Sheets

(56) References Cited

U.S. PATENT DOCUMENTS

| | | | | |
|---|---|---|---|---|
| 6,009,132 | A | * | 12/1999 | Scholtz .................. 375/355 |
| 6,389,082 | B1 | * | 5/2002 | Takigawa et al. ............ 375/316 |
| 6,678,012 | B1 | | 1/2004 | Belotserkovsky |
| 6,711,214 | B1 | | 3/2004 | Hershberger |
| 6,901,243 | B2 | * | 5/2005 | Jayaraman et al. ......... 455/63.1 |
| 2006/0018393 | A1 | | 1/2006 | Gore et al. |
| 2007/0092047 | A1 | * | 4/2007 | Amizic et al. ............... 375/355 |
| 2007/0098089 | A1 | | 5/2007 | Li et al. |

OTHER PUBLICATIONS

Hershberger, Continental Electronics, Inc., Architecture of a DSP Based Dual-Mode ATSC/NTSC Television Exciter and Transmitter.
Tektronix, Primer, "Fundamentals of 8VSB".
International Search Report dated May 11, 2010.

* cited by examiner

METHOD AND APPARATUS FOR DETERMINING CHANNELS IN A SIGNAL

CROSS REFERENCE TO RELATED APPLICATIONS

This application claims the benefit, under 35 U.S.C. §365 of International Application PCT/US2009/046053, filed Jun. 3, 2009, which was published in accordance with PCT Article 21(2) on Apr. 29, 2010 in English and which claims the benefit of U.S. provisional patent application No. 61/130,950, filed Jun. 3, 2008.

FIELD OF THE INVENTION

The present disclosure relates generally to the operation of a signal receiving system and more specifically to the receiving, searching, and identification of channels or transponders received by a signal receiving device.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Today, most customer homes receive a number of programs containing video and audio content, as well as a large amount of data, from a plurality of sources, such as broadcast television, cable, satellite, digital subscriber line systems. These systems often utilize distribution networks to deliver the programs and content to the customer premises. Many distribution networks carry content on multiple channels or transponders that may originate from different sources (e.g. multiple satellites, cable head-ends, etc). The multiple channels or transponders from different sources are brought together on a single medium (e.g. coaxial cable) before going, for example, into a customer's home for connection to a television or settop box. As a result, a frequency map identifying the incoming channels or transponders, as well as certain characteristics, such as data symbol rates or signal bandwidths, of each channel or transponder may not be completely known initially.

In instances where the frequency map is not completely known, the television or settop box may be designed to perform some form of channel or transponder search in order to identify channels or transponders, if possible along with channel or transponder characteristics, so that the television or settop box can proceed to properly demodulate and decode the signals. In one method the television or settop box may implement a blind transponder or channel search. In a blind search the signal is filtered by varying-bandwidth filters and then the demodulator in the link circuit attempts to demodulate the filtered signal. The demodulation is performed under assumption that the filtering was successful in presenting a single transponder or channel of interest at the demodulator input while sufficiently suppressing adjacent ones. Further the demodulation will be successful only if the frequency offset and symbol rate offset of that single transponder or channel are within pull-in range of the corresponding phase locked loops (PLLs) in the demodulator. The blind search continues through all possible combinations until all channels or transponders in the incoming signal have been searched. The blind search may create accurate identification results but is very slow and time consuming to apply.

In another approach, a Fast Fourier Transform (FFT) processor is used to perform either a complete or a piece-wise spectral analysis of the incoming signal. A subsequent analysis of the spectrum may include identifying signals based on characteristics such as the root-raised-cosine response or some other spectral shaping of each transponder or channel. The spectral characterization may allow identification of a transponder or channel along with its location and an estimate of its symbol rate or bandwidth. However, the uneven power distribution among the transponders or channels and the presence of high levels of additive noise, as well as the ubiquitous multi-path conditions that distort the signal spectrum may hinder the direct use of an FFT. As a result, the FFT approach ultimately may yield similar results for accuracy and speed compared to the above blind method.

The problem with the existing search approaches is further exacerbated by a system containing a large number of transponders or channels from multiple sources with many possible signal types. The above mentioned approaches can take an unacceptably long period of time to perform the search, detection, and identification. Further, if the network requires frequent re-initialization due to changes in the frequency map, the period of waiting for channel or transponder detection may be unacceptable to the user. Therefore, there is a need to perform improved transponder or channel detection, determination, and identification in a signal.

SUMMARY OF THE INVENTION

In accordance with an aspect of the present embodiments, a method is described including the steps receiving a signal containing a plurality of channels, filtering the signal to produce an indicator of a band edge of a channel, and determining a characteristic of the channel based on the indicator of the band edge.

In accordance with another aspect of the present embodiments, an apparatus is described that includes means for receiving a signal containing a plurality of channels, means for filtering the signal to produce an indicator of a band edge of a channel, and means for determining a characteristic of the channel based on the indicator of the band edge.

In accordance with yet another aspect of the present embodiments, an apparatus is described including a spectrum shift circuit that receives an input signal containing a plurality channels and shifts the frequency spectrum of the input signal, a filter coupled to the spectrum shift circuit that filters the frequency shifted signal to produce an indicator of a band edge of a channel, and a signal analysis circuit coupled to the filter and spectrum shift circuit, the signal analysis circuit determining a characteristic of the channel based on the indicator of the band edge, the signal analysis circuit controlling the frequency shift in the spectrum shift circuit based on the determined characteristic of the channel.

Figure 1:
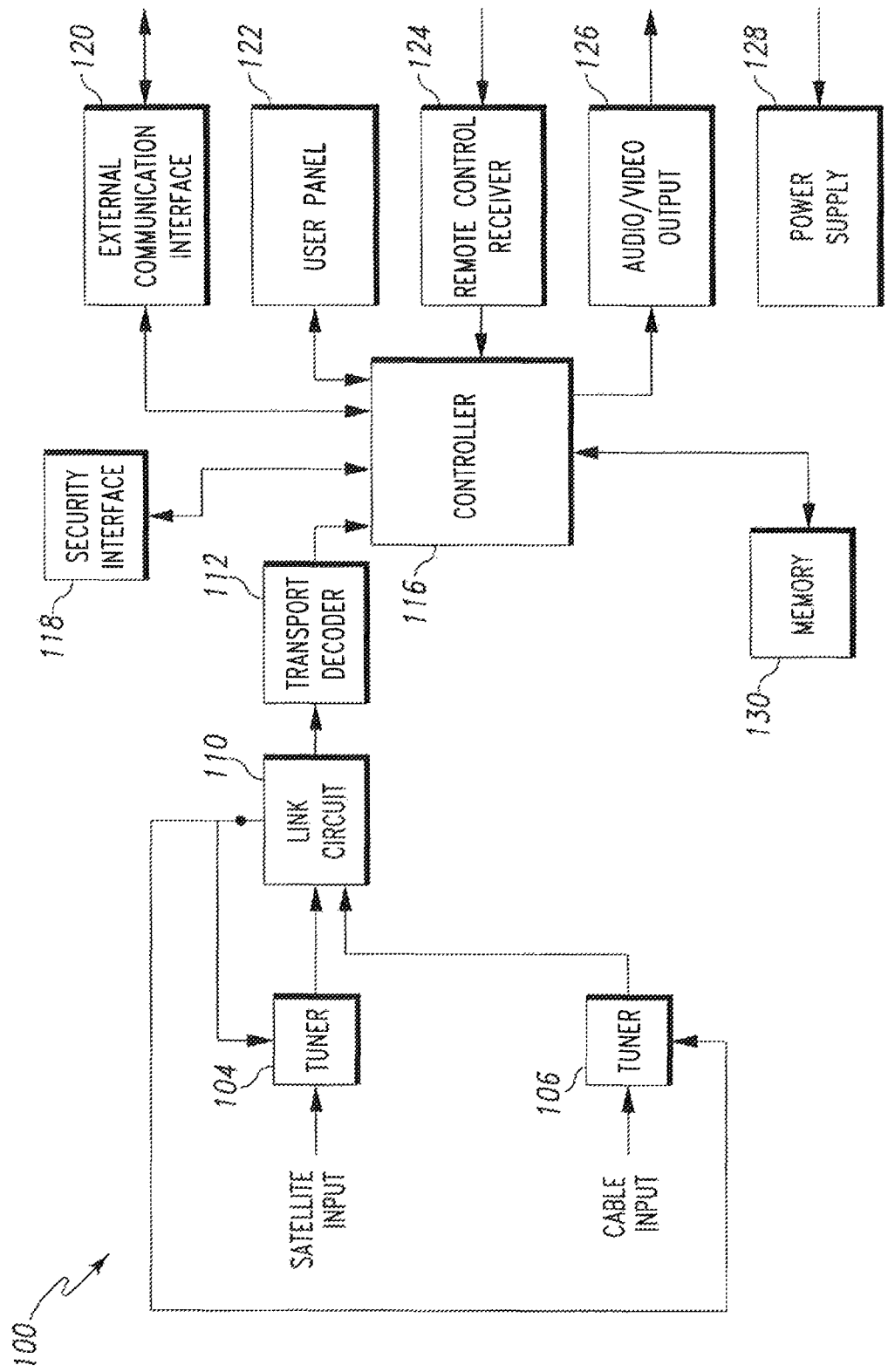
FIG. 1 is a block diagram of an embodiment of a receiver of the present disclosure.

The characteristics and advantages of the present disclosure may become more apparent from the following description, given by way of example.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to broadcast signals, and more particularly to broadcast signals as defined for use in a satellite or cable signal transmission system. The embodiments described may be used in a settop box, television, or similar signal receiving device. Examples of similar devices include, but are not limited to, cellular phones, intelligent phones, personal digital assistants, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards in general, may be transmitted in a manner other than over a satellite or cable network, including transmission over the air, through a wireless network, or over telephone lines. As such, in alternate embodiments, the components of the system may be rearranged or omitted, or additional components may be added. For example, with minor modifications, the system described may be configured for use in other terrestrial broadcast services, wi-fi video and audio services, or phone data services, including services used elsewhere in the world.

The embodiments described below are primarily related to reception of signals. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiment. Alternative embodiments may be possible using pipelining architectures employing repeated identical elements, connected in series, in place of, or in addition to, the iteration operation embodiments described herein.

Turning now to the drawings and referring initially to FIG. 1, an exemplary embodiment of a receiver 100 for receiving signals using aspects of the present disclosure is shown. Receiver 100 may be included as part of a settop box or television device and is capable of receiving either satellite signals or cable signals broadcast by a service provider to a customer premises location. A satellite signal stream, containing a plurality of transponders, is delivered from a satellite outdoor receiving unit, not shown, to a first tuner 104. A cable signal stream, also containing a plurality of channels, is delivered from a cable signal wired network to a second tuner 106. Tuner 104 and tuner 106 connect to link circuit 110. One output of link circuit 110 connects to transport decoder 112. A second output of link circuit 110 connects back to both tuner 104 and tuner 106. The output of transport decoder 112 connects to controller 116. Controller 116 also connects to security interface 118, external communication interface 120, user panel 122, remote control receiver 124, audio/video output 126, and memory 130. Power supply 128 may connect to all blocks, not shown, within receiver 100.

The satellite received signal stream is provided from an outdoor unit. The outdoor unit is configured to receive the signal stream from satellite transponders located on one or more satellites. In a preferred embodiment, two signals, each containing a plurality of transponders, are received by the outdoor unit, and converted to a frequency range of 950 to 2150 megahertz (MHz), referred to as L-band. The signal stream in the L-band frequency range is delivered to tuner 104.

Tuner 104 processes the satellite signal stream by selecting or tuning one or more of the transponders in the satellite signal stream to produce one or more baseband signals. Tuner 104 contains circuits such as amplifiers, filters, mixers, and oscillators, for amplifying, filtering and frequency converting the split signal stream. Tuner 104 typically is controlled, or tuned, by either link circuit 110 or by another controller, such as controller 116, which will be described later. The control commands include commands for changing the frequency of an oscillator used with a mixer in tuner 104 to perform the frequency conversion.

The cable received signal stream is provided from a cable plant network. The cable plant network is typically a network supporting wired transmission of content across a geographic area. The network provides an interface for the cable signal stream to a premises location, usually through coaxial cable. In a preferred embodiment, the cable received signal stream contains a plurality of channels located in the frequency range between 50 MHz and 800 MHz. The cable signal stream containing channels in this cable frequency range is delivered to tuner 106.

Tuner 106 processes the cable signal stream by selecting or tuning one or more of the channels in the cable signal stream to produce one or more baseband signals. Tuner 106 contains circuits, such as amplifiers, filters, mixers, and oscillators, for amplifying, filtering and frequency converting the cable signal stream. Tuner 106 typically is controlled, or tuned, by either link circuit 110 or by another controller, such as controller 116, which will be described later. The control commands include commands for changing the frequency of an oscillator used with a mixer in tuner 106 to perform the frequency conversion.

Typically the baseband signals at the output of tuner 104 or tuner 106 may collectively be referred to as the desired received signal and represent one or more transponders or channels selected, or tuned, out of the group of transponders or channels that were received as the input signal stream. Although the signal is described as a baseband signal, this signal may actually be positioned at a frequency that is only near to baseband.

The one or more baseband signals from tuner 104 and tuner 106 are provided to link circuit 110. Link circuit 110 typically contains the processing circuits, such as analog to digital (A/D) converters, needed to convert the one or more baseband signals into a digital signal for demodulation by the remaining circuitry of link circuit 110. In one embodiment the digital signal may represent a digital version of the one or more baseband signals. In another embodiment the digital signal may represent the vector form of the one or more baseband signals. Link circuit may also select which one of the baseband signals from tuner 104 and tuner 106 is processed. In one embodiment, a user control selects either a cable mode or a satellite mode. The control information is provided to the link circuit 110 from controller 116. The link circuit then selects either the signal from tuner 104 for satellite mode or the signal from tuner 106 cable mode for further processing.

Link circuit 110 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS). Operation of portions of link circuit 110 will be described in further detail below. Link circuit 110 also includes circuitry for detecting and identifying channels or transponders in the digital signal. The circuitry for detecting and identifying channels or transponders may operate in conjunction with tuner 104 and tuner 106 in order to control tuning of the signal. Operation of the circuitry for identifying and detecting channels or transponders will be described in further detail below.

The transport signal from link circuit 110 is provided to transport decoder 112. Transport decoder 112 typically separates the transport signal, which is provided as either a SPTS or MPTS, into individual program streams and control signals. Transport decoder 112 also decodes the program streams, and creates audio and video signals from these decoded program streams. In one embodiment, transport decoder 112 is directed by user inputs or through a controller, such as controller 116, to decode only the one program stream that has been selected by a user and create only one audio and video signal corresponding to this one decoded program stream. In another embodiment, transport decoder 112 may be directed to decode all of the available program streams and then create one more audio and video signals depending on user request.

The audio and video signals, along with any necessary control signals, from transport decoder 112 are provided to controller 116. Controller 116 manages the routing and interfacing of the audio, video, and control signals and, further, controls various functions within set top box 100. For example, the audio and video signals from transport decoder 112 may be routed through controller 116 to an audio/video (A/V) output 126. A/V output 126 supplies the audio and video signals from set top box 100 for use by external devices such as televisions or computers. Also, the audio and video signals from transport decoder 112 may be routed through controller 116 to memory block 130 for recording and storage. Memory block 130 may contain several forms of memory including random access memory (RAM), flash, hard media such as a hard disk drive. Memory block 130 may include a memory section for storage of instructions and data used by controller 116 as well as a memory section for audio and video signal storage. Controller 116 may also allow storage of signals in memory block 130 in an alternate form such as an MPTS or SPTS from transport decoder 112.

Controller 116 is also sends signal to, and receives signals from, an external communication interface 120. External communication interface 120 may include a phone modem for providing phone connection to a service provider. External communication interface 120 permits, among other things, the authorization by a service provider for the use of the audio and video signals in receiver 100. Controller 116 also sends signals to and receives signals from a security interface 118 Security interface 118 may include a smart card, for communicating signals for managing the use of the audio/video signals and preventing unauthorized use. User control is accomplished through user panel 122 and remote control receiver 124. User panel 122 provides a direct input of user commands to control the operation of receiver 100 while remote control receiver 124 is used for receiving user commands from an external remote control device. Both user panel 122 and remote control receiver 124 provide user control signals to controller 116. Although not shown, controller 116 may also interface signals to the tuner 104, tuner 106, link circuit 110, and transport decoder 112 to provide initial set-up information as well as for passing control information between the blocks. Finally, power supply 128 typically connects to all of the blocks in receiver 100 and supplies the power to those blocks as well as providing power to any of the elements needing power externally, such as the satellite outdoor unit.

It should be appreciated by one skilled in the art that the blocks described inside receiver 100 have important interrelations, and some blocks may be combined and/or rearranged and still provide the same basic overall functionality. For example, link circuit 110 and transport decoder 112 may be combined and further integrate some or all of the functions of controller 116 to act as the main decoder/controller for set top box 100. Further, control of various functions may be distributed or allocated based on specific design applications and requirements, such as use in a settop box or television device.

Figure 2:
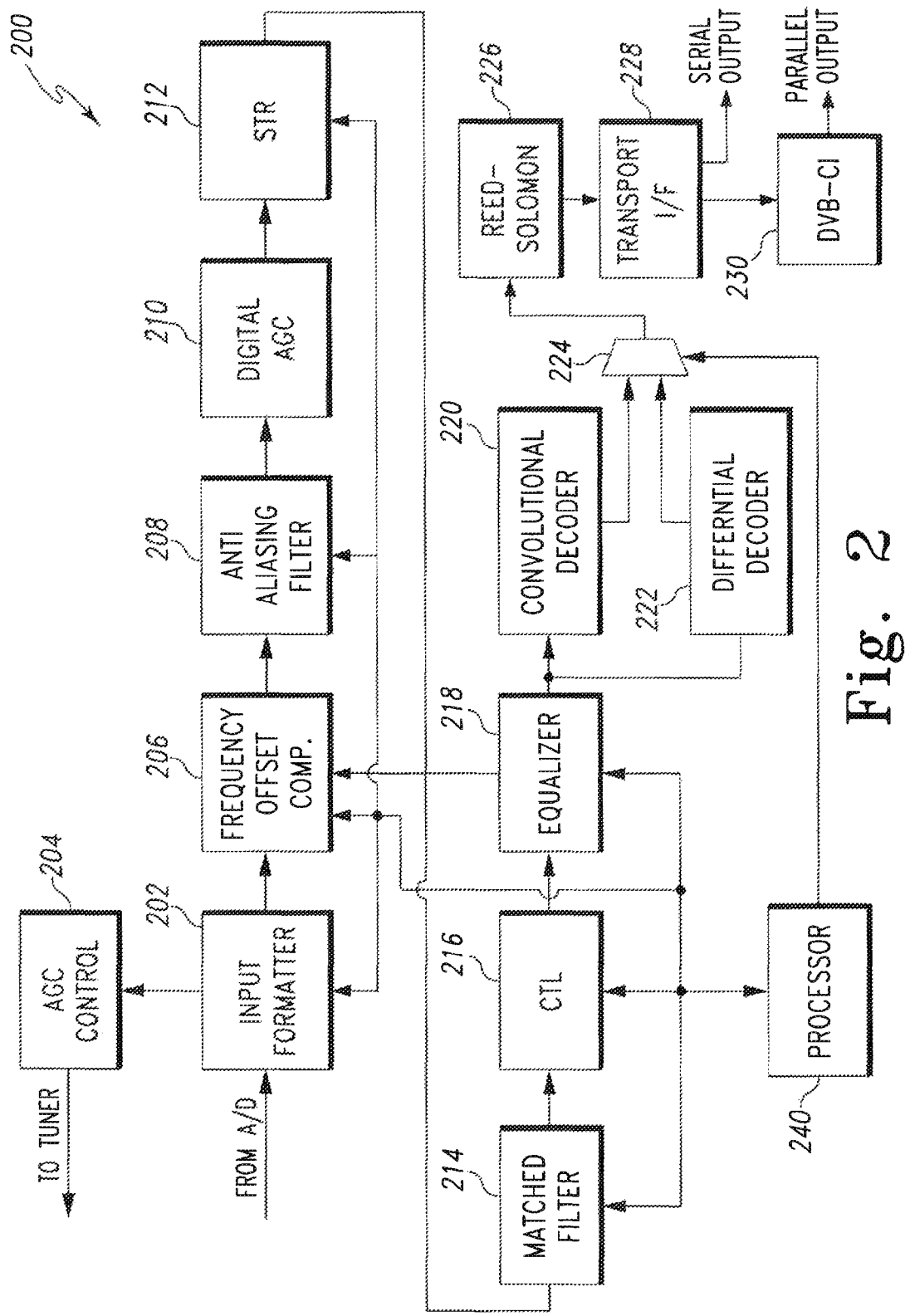
FIG. 2 is a block diagram of an embodiment of a link circuit used in a receiver of the present disclosure.

Turning now to FIG. 2, a block diagram of an embodiment of a link circuit 200 using aspects of the present disclosure is shown. Link circuit 200 may be used in a signal receiver, such as receiver 100 described in FIG. 1. Link circuit 200 is capable of receiving and demodulation signals in several signal formats provided by satellite, cable, or terrestrial transmission systems including, but not limited to quaternary phase shift keying (QPSK) and 16 level quadrature amplitude (16 QAM) modulation, 32 QAM modulation, 64 QAM modulation and 256 QAM modulation. In a preferred embodiment, link circuit 200 is capable of receiving and demodulating signals according to the DVB-S and DVB-C standards.

In link circuit 200, an input signal is received from an A/D converter, not shown, and provided to the input formatter 202. The input formatter 202 is connected to an automatic gain control (AGC) 204, which provides a signal back to a tuner, such as tuner 104 or tuner 106 in FIG. 1. Input formatter 202 is also connected to frequency offset compensation circuit 206. The frequency offset compensation circuit 206 is connected to an anti-aliasing filter 208. The anti-aliasing filter 208 is connected to digital AGC 210. The digital AGC 210 is connected to the sampling timing recovery (STR) block 212. The STR block 212 is connected to the matched filter 214. The matched filter 214 is connected to the carrier tracking loop (CTL) 216. The CTL is connected to the equalizer 218. The equalizer 218 is connected to both the convolutional decoder 220 and the differential decoder 222. The equalizer 218 is also connected as feedback back to the frequency offset compensation circuit 206. The convolutional decoder 220 and differential decoder 222 are connected to mux 224. The output of mux 224 is connected to Reed-Solomon decoder 226. The output of Reed-Solomon decoder 226 is connected to the transport interface 228. Transport interface 228 provides an output as a serial transport output stream used by a transport decoder, such as transport decoder 112 in FIG. 1. The transport interface 228 is also connected to a DVB-Common Interface (DVB-CI) block 230. DVB-CI block outputs a parallel data transport stream specifically for use by transport decoders complying with the DVB-CI standard.

It is important to note that the format of the data signals passed between the blocks in link circuit 200 are complex phasor representations of the received signal may be in a vector signal format. Vector signal format signals permit interconnections using a single data line connection. Alternatively, the format of the signals may be in a scalar format, such as I/Q signal format. I/Q signal format signals require two data lines and connections, one each for the I and Q signal. Choice of signal format used may depend on the type of A/D converter used or may be a matter of design choice The incoming signal is provided to the input formatter 202. Input formatter 202 removes any DC offset introduced by the A/D converter. In addition, the input formatter 202 may perform a spectral inversion and/or a binary offset to two's complement conversion if necessary based on the signal format. Further, input formatter 202 may also remove any I/Q imbalance, if the signal is provided in I/Q format, by adaption of I/Q gain imbalance and I/Q phase imbalance.

One signal from the input formatter 202 is provided to AGC 204. AGC 204 provides control signal to a tuner, such as tuner 104 or tuner 106 in FIG. 1, for adjusting the signal gain or amplification in the tuner. The control signal may be based on a determination of signal power or some other form of measurement of signal quality.

The other formatted signal from the input formatter 202 is provided to the frequency offset compensation circuit 206. The frequency offset compensation circuit 206 operates to subtract or remove coarse frequency error present in the signal by controlling a frequency offset register or using a leakage signal that may be generated in CTL 216, processed in equalizer 218, and provided as a feedback signal back to the frequency offset compensation circuit 206.

The offset compensated signal is provided to anti aliasing filter 208. Anti aliasing filter 208 is used to suppress undesired signal products introduced by the tuning and demodulation process, such as signal frequency conversion aliasing. Anti aliasing filter 208 may be implemented using a number of known digital filter techniques. In a preferred embodiment, anti aliasing filter 208 is a fully programmable 49 tap symmetric finite impulse response (FIR) filter.

The filtered signal is provided to digital AGC 210. The digital AGC 210 measures the incoming signal level or the incoming signal quality, computes a gain error signal, and adjusts the signal level of the signal. Digital AGC 210 adjusts the signal in order to provide a maximum level or maximum signal quality signal using all of the available dynamic range prior to the critical signal demodulation steps that follow.

The digital AGCed signal is provided to STR block 212. STR block 212 adaptively resamples the signal over a range of resampling rates in order to produce 2 samples/symbol and to correct for sample timing errors relative to the position of the samples within the symbol. STR block 210 also provides a symbol enable signal for indication of the optimum sampling point and a sample enable signal for providing the second sample on the symbol. STR block 210 may perform phase error estimation as part of the resampling and re-timing using a number of estimation algorithms, such as the Gardner 2× algorithm.

The re-sampled signal is provided to matched filter 214. The matched filter 214 provides the necessary spectral shaping of the signal in order to minimize inter-symbol interference. The matched filter 214 filter response is specified based on the specifications for the transmitted signal format. The specification will typically identify the filter characteristic, such as a root-raised cosine spectral shaping, and also specify a rolloff factor as a percentage the signal bandwidth or the symbol rate. Matched filter 214 is typically implemented as a multi-tap FIR filter having one or more programmable filter taps in order to account for the possible filter responses.

The matched filtered signal is provided to CTL block 216. CTL block 216 adaptively removes the fine frequency and phase offset introduced by inaccurate mixing or frequency drift in a tuner or low noise block converter (LNB). Additionally, CTL block 216 may generate an error signal indicating a coarse frequency error. The coarse frequency error may be provided for use by another frequency adjustment block, such as the frequency offset compensation block 206 after processing in the equalizer 218. The coarse frequency error may also be provided to the microprocessor 240 to indicate that the tuner, such as tuner 104 or tuner 106 in FIG. 1, may be re-tuned to reduce the frequency error.

The frequency corrected signal is provided to equalizer 218. In general, equalizer 218 is configured to reduce the multi-path distortion effects of the transmission channel through which the received signal has been transmitted. Equalizer 218 may adjust or change the amplitude or phase information associated with received signal. Equalizer 218 adjusts the amplitude or phase information based on information from computations and operations performed on the demodulated OFDM signal within equalizer 640. Equalizer 218 may use a finite impulse response (FIR) or feed forward equalization (FFE) algorithm as well as a decision feedback equalization (DFE) algorithm, both employing adaptable filter structures that may be real valued or complex valued. The calculation of the adjustable tap values in the filter may employ a least mean square (LMS) algorithm, where the LMS error could be calculated in decision-directed or blind mode. The equalizer may also partially or fully demodulate the modulated symbols in the received signal into a string of bits.

The equalized and demodulated signal is provided to convolutional decoder 220 and also to differential decoder 222. Each of these decoder circuits is included for demodulating and decoding specific signal formats included in cable or satellite signal transmission specifications. In a preferred embodiment, convolutional decoder 220 is adapted for decoding the bit stream based on the DVB-S signal format while the differential decoder is adapted for decoding a bit stream based on the DVB-C signal format.

Each of the decoded signals from convolutional decoder 220 and differential decoder 222 is provided to mux 224. Mux 224 selects one of the two signals produces that signal as an output. The selection may be done based on predetermined information, such as a user input selecting a particular operating mode, either cable or satellite. The selection may also be performed automatically, based on the determination and identification of the signal type using the signal detection technique described below. Additionally, the decoder producing the non-selected signal, either convolutional decoder 220 or differential decoder 222, may be disabled in order to conserve power.

The selected decoded output is provided to the Reed-Solomon decoder 226. Reed-Solomon decoder groups portions of the signal into packets of bytes of data. In a preferred embodiment, Reed-Solomon encoder groups the data in the signal into packets containing 204 bytes of data. Reed-Solomon decoder 226 decodes each packet of 204 bytes of data to produce 188 error corrected bytes. The Reed-Solomon process defined here is capable of correcting errors in up to 8 bytes in each packet.

The Reed-Solomon decoded data packets are provided to the transport interface 228. Transport interface 228 formats the data packets in order to produce a serial transport data stream that is output for use in a transport decoder. The transport interface stream is also provided to the DVB-CI interface 230. The DVB-CI interface re-formats the serial transport stream into a parallel transport stream and makes any additional changes to the stream to comply with the requirements of the DVB-CI specification. DVB-CI interface 230 outputs a DVB-CI compliant parallel transport stream signal.

Processor 240 provides control signals and a separate communications interface to the various blocks within link circuit 200. Processor 240 may be embodied as a separate hardware device, such as a microprocessor, or may alternatively be embodied as part of a larger central processing unit within a receiving device. Processor 240, may for instance, receive inputs from either the frequency offset compensation circuit 206 or equalizer 218 and provide control signal outputs to a tuner, such as tuner 104 or tuner 106 in FIG. 1 based on those received inputs. Processor 240 may also include a memory for storing information such as channel information and operational data such as initial settings for the blocks in link circuit 200.

Depending upon the mode of operation, several of the blocks within the link circuit 200 may be active or inactive and may further be operationally bypassed. For instance, link circuit may be operated in a mode that allows initial channel or transponder determination or detection. In channel determination mode, several of the blocks may be inactive and only the blocks necessary for signal identification, such as input formatter 202, AGC control 204, frequency offset compensation circuit 206, and equalizer 218, may remain operational. The reduced number of active blocks may improve the operational efficiency and speed of the transponder or channel determination and identification process. The determination and identification process will be described in further detail below.

Figure 3:
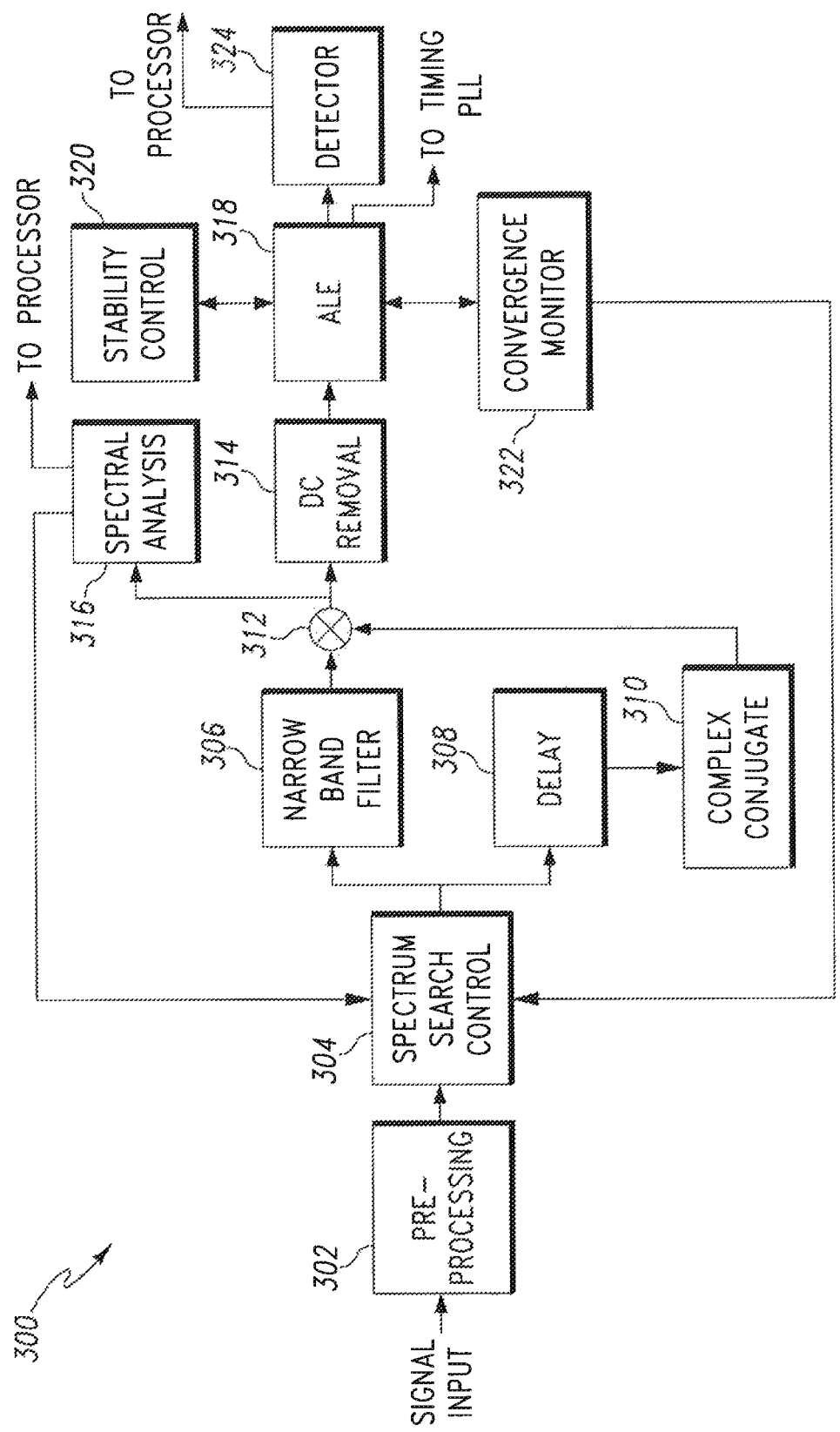
FIG. 3 is a block diagram of an embodiment of a search circuit used in a receiver of the present disclosure.

Turning now to FIG. 3, a block diagram of an embodiment of a signal identification circuit 300 using aspects of the present disclosure is shown. Signal identification circuit 300 is typically included as part of a frequency compensation block, such as frequency offset compensation block 206 described in FIG. 2. Alternatively, all or a portion of the signal identification circuit 300 may be included in other blocks in a link circuit, such as the input formatter 202 or equalizer 218. Signal identification circuit 300 includes circuitry that is advantageous for performing determination and identification of multiple transponders in an incoming satellite signal located in unknown frequency locations and having varying bandwidth and power. Signal identification circuit 300 quickly and accurately detects transponder boundaries and symbol rates as they are related to the signal bandwidth. It is important to note that signal identification circuit 300 may equally apply to identification of multiple channels in a cable transmission network or terrestrial transmission network where the channel locations and bandwidths are also unknown.

A signal input is provided to pre-processing block 302. The pre-processing block 302 is connected to a spectrum search control block 304. The spectrum search control block 304 is connected to a narrowband filter 306 and delay 308. The delay 308 is connected to a complex conjugate block 310. The narrowband filter 306 and complex conjugate block 310 are connected to multiplier 312. The multiplier 312 is connected to DC removal block 314 and to spectral analysis block 316. The spectral analysis block 316 is connected as feedback back to the spectrum search control 304. The DC removal block 314 is also connected to the Adaptive Line Enhancer (ALE) 318. The ALE 318 is connected to stability control block 320, convergence monitor 322, and detector 324. The convergence monitor 322 is connected as feedback back to spectrum search control 304. The ALE 318 may also provide a control signal output to a signal timing block in a link circuit, such as CTL 216 or STR 212 shown in FIG. 2.

The detector 324, as well as spectral analysis block 316, also provides output signals that may be used as part of the control by a processor, such as processor 240 in FIG. 2, of other circuits within a link circuit. For example, the output signals from detector 324 and spectral analysis block 316 may include identification characteristic data such as center frequency, symbol rate, and channel bandwidth of an identified transponder. The identification data may be provided to other blocks in the link circuit for specific channel set-up when tuning of transponders is requested. The identification data may also be stored in a memory, not shown, that is interfaced to the blocks in the link circuit.

An incoming signal, containing a digitized portion of the received signal spectrum, such as the signal from an A/D converter, is provided to the pre-processing circuit 302. Pre-processing circuit 302 provides some initial signal processing and re-formatting including, but not limited to, filtering and sample rate conversion. In a preferred embodiment, the pre-processing circuit 302 includes a bandpass filter, with a frequency passband wide enough to contain at least one full transponder, followed by a down-sampling circuit to reduce the sampling rate to a rate slightly above the Nyquist rate for at least one of the possible input transponders.

The output signal from pre-processing circuit 302 is provided to the spectrum search control 304. The spectrum search control 304 adaptively controls the relative position in frequency of the frequency shifted spectrum of the pre-processed signal. The adaptive shifting of the spectrum allows the processing blocks following the spectrum search control 304 to detect and identify the characteristics of a transponder. In a preferred embodiment, the spectrum search control 304 includes a complex multiplier structure configured as a frequency converter and a numerically controlled oscillator. The output of the numerically controlled oscillator, along with the incoming pre-processed signal, is connected to the complex multiplier structure. The complex multiplier structure multiplies the two signals to produce a frequency output spectrum of the incoming pre-processed signal. The numerically controlled oscillator is programmable as to the operating frequency and also may allow an adjustable frequency step size. Control for the numerically controlled oscillator may be provided by another control block, such as the spectral analysis block 316 or convergence monitor 322, as part of the transponder detection and identification process.

The frequency shifted output signal from spectrum search control 304 is provided to narrowband filter 306. Narrowband filter 306 is a complex digital filter that has a spectral passband only as wide as is necessary to pass all of the signal energy of the band edge frequency bandwidth for any of the possible transponders. As a result, narrowband filter 306 may be referred to as a band edge filter. Narrowband filter 306 may contain digital filter tap or weight values that are programmable and may configured as an FIR filter, an IIR filter, or a combination of both.

The frequency shifted output signal from spectrum search control 304 is also provided to delay 308. Delay 308 is a digital delay block that delays the frequency shifted output signal for a time period equal to the processing delay of narrowband filter 306. The delayed output is then provided to complex conjugate block 310. Complex conjugate block 310 conjugates the delayed signal by negating the imaginary portion of the delayed signal. The delay value in delay block 308 is determined based on proper time alignment of the signal from complex conjugate block 310 with the output of narrowband filter 306 prior to multiplier 312.

The delayed complex conjugate signal and the narrowband filtered signal are provided to multiplier 312. Multiplier 312 is typically implemented as a full-complex multiplier. The output of multiplier 312 is provided to DC removal block 314. DC removal block 314 eliminates any DC offset signal that may be created as an undesired output due to the narrowband filter 306 and multiplier 312. Removal of the undesired DC offset signal component may be necessary to prevent the DC offset signal from interfering with the detection and identification process in subsequent processing blocks.

Narrowband filter 306, along with the additional filtering and combining circuits including delay 308, complex conjugate block 310, multiplier 312, and DC removal block 314, form the core processing circuitry for band edge detecting the presence of a transponder in the frequency shifted spectrum. The band edge detection produces an indicator of the band edge of a transponder. The indicator may be a single frequency tone signal produced at the output multiplier 312. A single frequency tone signal, or pseudo-tone signal, will be present at the output of multiplier 312 when a band edge of a transponder in the incoming signal that has been frequency shifted by spectrum search control 304 passes through the passband of narrowband filter 306. The presence of the pseudo-tone signal provides an indicator of the presence of a transponder. Further, one or more pseudo-tone signals may be further processed to provide an indicator of a transponder present in the signal and in order to determine other important characteristics related to the identified transponder, such as the symbol rate, signal bandwidth, and center frequency.

The output signal from multiplier 312 is also provided to spectral analysis block 316. Spectral analysis block 316 analyzes the frequency spectrum of the signal from multiplier 316 in order to determine the presence of the pseudo-tone signal that is generated in the prior detecting blocks as a result if the presence of a transponder. Spectral analysis block 316 also analyzes the spectrum to determine the exact frequency location of the pseudo-tone signal if one is present. Successful identification of the frequency location of the pseudo-tone signal indicates that a band-edge of a transponder has been found and also provides information related to the symbol rate and center frequency based on the frequency location of the pseudo-tone signal.

Spectral analysis block 316 may include an FFT processing block. The dimension, or number of points in the FFT, may be determined based on the desired accuracy for identifying the location of the pseudo-tone signal as well as the frequency span for the analysis. In a preferred embodiment, FFT spectrum analysis block 316 includes a 512 point FFT. It is important to note that the frequency span of the FFT spectrum analysis block is typically limited to the frequency bandwidth of the filter in pre-processing circuit 302. The frequency span of the FFT may alternately be limited to the frequency span of the incoming signal spectrum.

Spectral analysis block 316 may also include a frequency control circuit. Frequency control circuit provides the frequency control information for use by spectrum search control block 304. The frequency control circuit controls the frequency offset position for the spectrum search control based on the analysis of the signal in the spectral analysis block 316. For instance, if a pseudo-tone signal is not located within the frequency span of the spectral analysis block 316, then the frequency control provides a control signal to the spectrum search control block to increment or shift the frequency spectrum to a next frequency shifted range. The nominal frequency shift, or frequency step, may typically be based on the passband bandwidth of the narrowband filter 306 in order to minimize problems with the band edge detection process. However, if a pseudo-tone signal is located and identified within the frequency span of the spectral analysis block 312, indicating the presence of a first band edge of a transponder, then the frequency control may provide a control signal to shift the frequency spectrum to the expected location of the other band edge of the identified transponder based on a determination of the symbol rate from the pseudo-tone signal. It is important to note that the first band edge may be either the upper or lower band edge of the transponder. As a result, the other band edge, the second band edge of the transponder will be either the lower or the upper band edge.

The frequency control circuit within the spectral analysis block 316 may also provide a control signal to a tuner, such as tuner 104 or tuner 106 in FIG. 1, in order to re-tune the tuner to a different frequency portion of the received input signal. Spectral analysis block 316 may also include a memory for storing characterization information associated with the identification of transponders, such as center frequency, symbol rate, and bandwidth.

The output signal from the DC removal block 314 is provided to ALE 318. ALE 318 is an iteratively adaptive circuit capable of identifying the presence of a pseudo tone signal and identifying its location in the incoming frequency shifted spectrum. ALE 318 operates in a manner similar to a phase locked loop by iteratively locking onto the pseudo-tone signal. In order to improve the operation of ALE 318, one or more loop operating parameters may be adapted based on the incoming signal as well as a computed error signal. Once ALE 318 locks onto the pseudo-tone signal, the steady state or locked loop operating parameters may be used to determine the frequency location of the pseudo-tone signal. ALE 318 may be implemented using several possible loop transfer functions. Further operation of ALE 318 will be described in further detail below.

ALE 318 may advantageously utilize a transfer function that is potentially unstable. In order to control stability issues, stability control block 320 is interfaced to ALE 318. Stability control block 320 ensures stability of the ALE convergence by monitoring key loop parameters in order to prevent these parameters reaching values that result in an instability. In a preferred embodiment, stability control block 320 monitors the product of a first loop parameter that is used to control loop operating bandwidth and the absolute value of a second loop parameter that is used to control loop operating frequency. Stability control block forces the product to remain less than unity while allowing the phase of parameter used to control loop operating frequency to adapt freely.

ALE 318 may also advantageously utilize a transfer function that may not properly converge to a final locked value under all operating conditions. Convergence monitor block 322 monitors and controls convergence of the processing within ALE 318. If the pseudo-tone is present at the output of multiplier 312, ALE will zero in on the tone in a manner similar to a conventional PLL. As the filter converges, value of the phase of a loop parameter, identified as γ, will asymptotically approach the exact frequency of pseudo-tone signal, determined as a fraction of the sampling rate. The convergence can be monitored using well known techniques used to monitor convergence of a conventional PLL, such as by tracking a loop integrator value. Convergence monitor 322 may also provide a control signal to spectrum search control block 304 in a manner similar to that described for spectral analysis block 316.

The converged or locked output signal of ALE 318 is provided to detector 324. Detector 324 processes the signal and extracts characteristics related to the identified transponder, such as symbol rate, center frequency, and bandwidth, from the steady-state value of a loop parameter, such as γ. The information about the characteristics of any identified transponders may then be sent to a controller or processor, such as microprocessor 240 in FIG. 2, for use during normal operation of the link circuit. The information values may also be stored in a memory included in detector 324. Alternatively, the output of ALE 318 may be used to drive signal timing circuits, such as STR 212 or CTL 216 shown in FIG. 2, directly without explicitly determining the characteristics of the identified transponder.

As described above, the spectral analysis block 316 and the adaptive line enhancement blocks including ALE 318, stability control 320, convergence monitor 322, and detector 324, may produce similar determination and identification results using different determination and identification approaches. As a result it may be possible for embodiments to include only the blocks associated with implementing one of the two approaches. For example, the DC removal block 312, ALE 318, stability control 320, convergence monitor 322, and detector 324 may be removed in order to implement a spectral analysis based approach for channel or transponder determination and identification. Similarly, the spectral analysis block 316 may be removed in order to implement an ALE based approach.

It is important to note that the ALE based approach for channel or transponder determination and identification implemented in ALE 318 may complement the spectral analysis approach implemented in spectral analysis block 316. The ALE based approach detects and identifies the pseudo-tone signal, and therefore the transponder, using a completely independent and different method from the spectral analysis approach. In some instances, such as the presence of severe signal multipath distortion, either spectral analysis block 316 or ALE 318 may provide a faster of more accurate identification of the pseudo-tone signal. For example, the spectral analysis approach, using a small FFT in spectral analysis block 316 may be used to determine a coarse frequency estimate of the pseudo-tone signal. The coarse frequency estimate may then be provided as a starting point for the adaptive ALE approach in ALE 318. As a result, it may be advantageous to employ both methods in a simultaneous or complementary manner.

Figure 4:
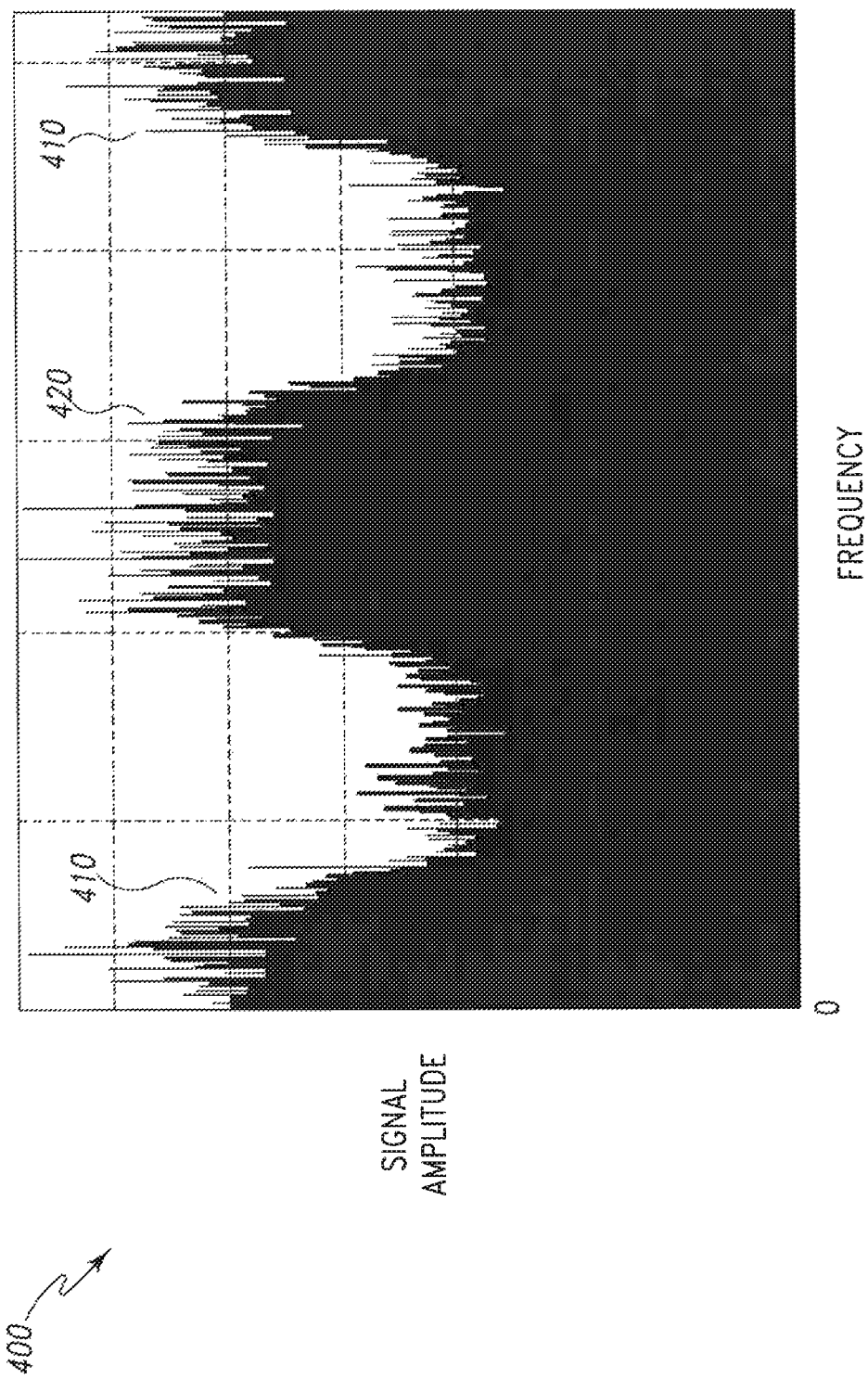
FIG. 4 is a graph illustrating a frequency spectrum of a signal at the input of a search circuit of the present disclosure.

Turning now to FIG. 4, a graph 400 illustrating the frequency spectrum of the signal present at the input to a band edge detection circuit is shown. Graph 400 represents the frequency spectrum of the signal at the input to pre-processing circuit 302. Graph 400 displays signal frequency, normalized to the sampling rate from DC to a frequency of one half of the sampling rate (fs/2) along the x axis. Graph 400 displays spectrum amplitude of the signal along the y axis. Graph 400 illustrates two unknown transponders present in the frequency spectrum, 410 and 420 in the presence of white noise. It is important to note that transponder 410 is shown across two separate frequency segments at each of the graph. Transponder 410 is located, or centered, at or near DC and the separation is a result of the frequency spectrum being normalized to the sampling rate, fs, and displaying only a frequency range from DC to fs. As described above, processing the signal using techniques such as an FFT or a blind signal detection technique would create a result that is error-prone and require a time consuming analytical process.

In order to determine and identify a transponder, spectrum search control block 304, under control from either spectral analysis block 318 or convergence monitor 322, begins shifting the frequency spectrum of the portion of the incoming signal, as shown in FIG. 4, from a first or lower frequency starting point. With each shift in frequency, filtering and detection is done using narrowband filter 306, delay 308, complex conjugate block 310 and multiplier 312. The frequency shift continues in small or nominal frequency increments until a band edge for the first transponder in the signal is passed through narrowband filter 306 and detected. The band edge detection will generate a strong pseudo-tone signal located at a specific frequency at the output of multiplier 312. The specific frequency of the pseudo-tone signal will be equal to, or related to, the symbol rate frequency of the identified transponder.

Figure 5:
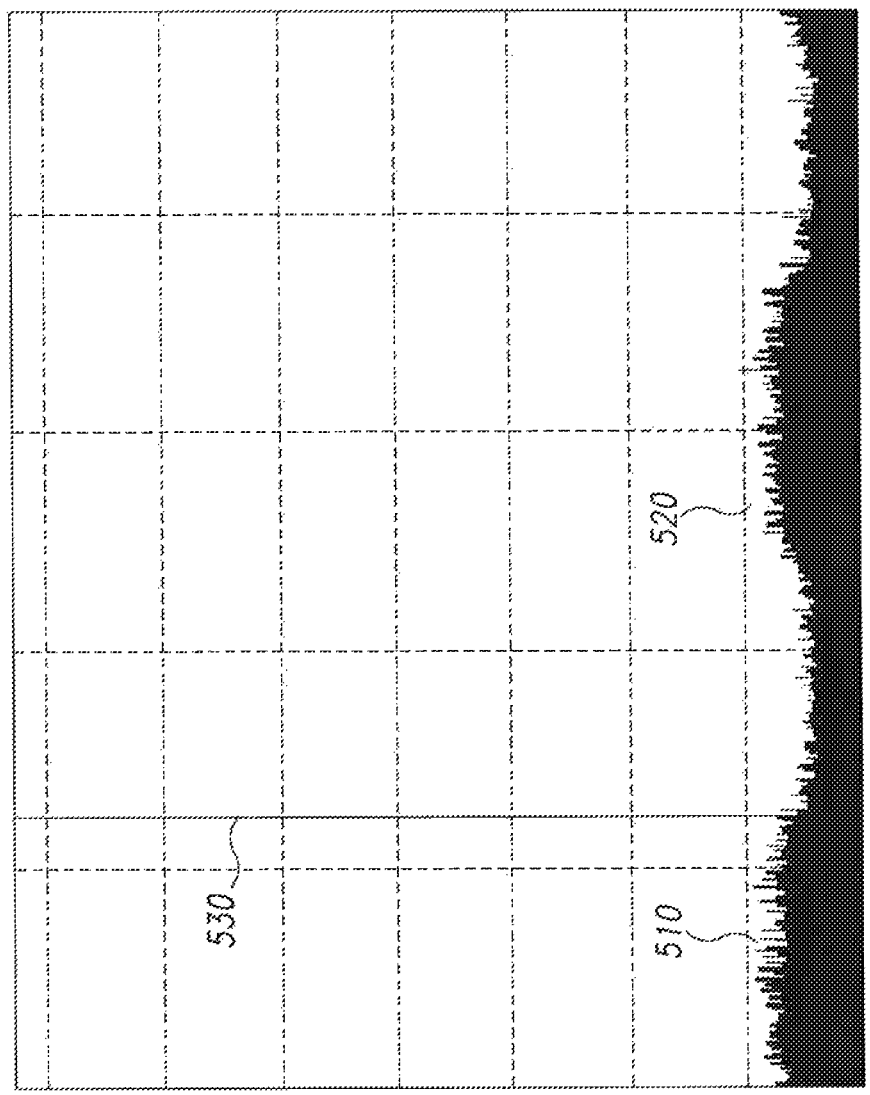
FIG. 5 is a graph illustrating a frequency spectrum of a signal at the output of a band edge detection circuit of the present disclosure.

Turning now to FIG. 5, a graph 500 illustrating the frequency spectrum of a signal present at the output of a band edge detection circuit is shown. Graph 500 illustrates a pseudo-tone signal 530 produced by the band edge detection process. The pseudo-tone signal 530 is in the presence of transponders 510 and 520 that have been frequency shifted relative to the positions of the same transponders identified as transponders 410 and 420 in FIG. 4. The spectral signal energy or amplitude of transponders 510 and 520, as well as the noise present, also has been shaped due to band edge detecting process implemented by narrowband filter 306, delay 308, complex conjugate 310, and multiplier 312. Narrowband filter 306 may typically be narrow enough in bandwidth to preserve most of the band edge energy in a transponder while suppressing other out of band undesired spectral signal energy. As described earlier, the presence of the pseudo-tone signal 530 as well as its location in frequency may be identified.

Pseudo-tone signal 530 represents the pseudo-tone signal resulting from detecting the first (e.g. lower or upper) band edge of transponder 510. Once the pseudo-tone signal is detected and identified, the associated transponder symbol rate may be computed from the pseudo-tone frequency. The symbol rate information may be used as control information and provided to spectrum search control block 304 to make a large frequency step equal to the symbol rate frequency. The channel frequency step shifted frequency spectrum may position the second (e.g. upper or lower) band edge of transponder 510 to pass through narrowband filter 306 resulting in the creation a pseudo-tone signal association with the upper band edge of transponder 510. The identification of the pseudo-tone signal associated with the upper band edge allows for a cross-check of identification and characterization results determined based on the pseudo-tone signal for the lower band edge.

Figure 6:
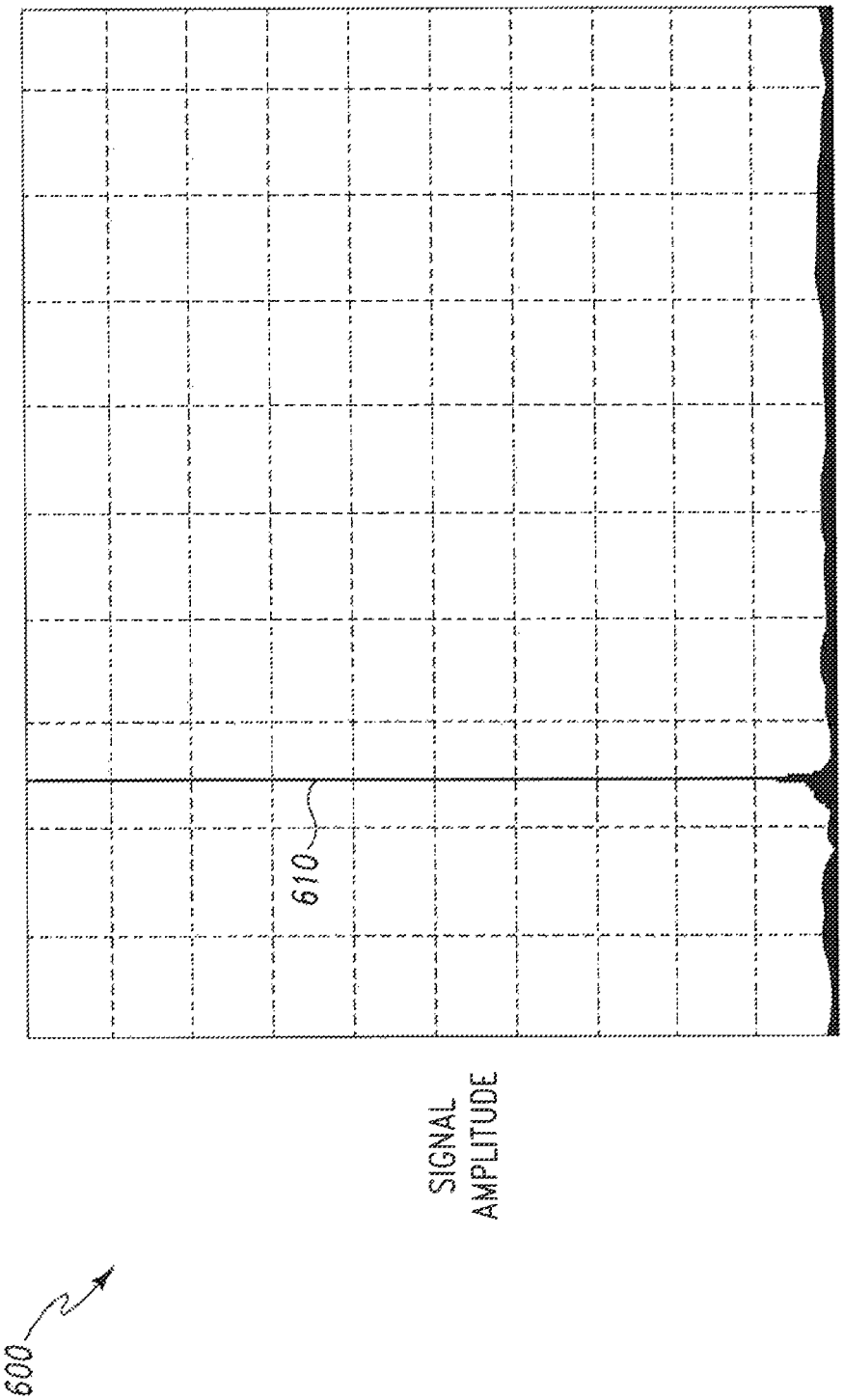
FIG. 6 is a graph illustrating a frequency spectrum of a signal at the output of an adaptive line enhancement circuit of the present disclosure.

Turning now to FIG. 6, a graph 600 illustrating the signal present at the output of ALE 318 is shown. Graph 600 illustrates a pseudo-tone signal 610 originally produced by the band edge detection process and further enhanced by the processing in ALE 318. Pseudo-tone signal 610 represents the pseudo-tone signal resulting from detecting the first (e.g. lower or upper) band edge of a transponder, similar to pseudo-tone signal 530 in FIG. 5. The presence of the pseudo-tone signal 610 may be determined in ALE 318. Further, the exact frequency location of the pseudo-tone signal 610 may be identified using the loop parameters generated in ALE 318. As described earlier, the iteratively adaptive processing in ALE 318 may significantly improve the signal quality of the pseudo-tone signal by suppressing the transponder signal energy and noise present in the signal. As described above in FIG. 5, the information associated with the identified transponder may be determined and used for further processing, such as implement a channel step frequency shift in the spectrum search control block 304.

Figure 7:
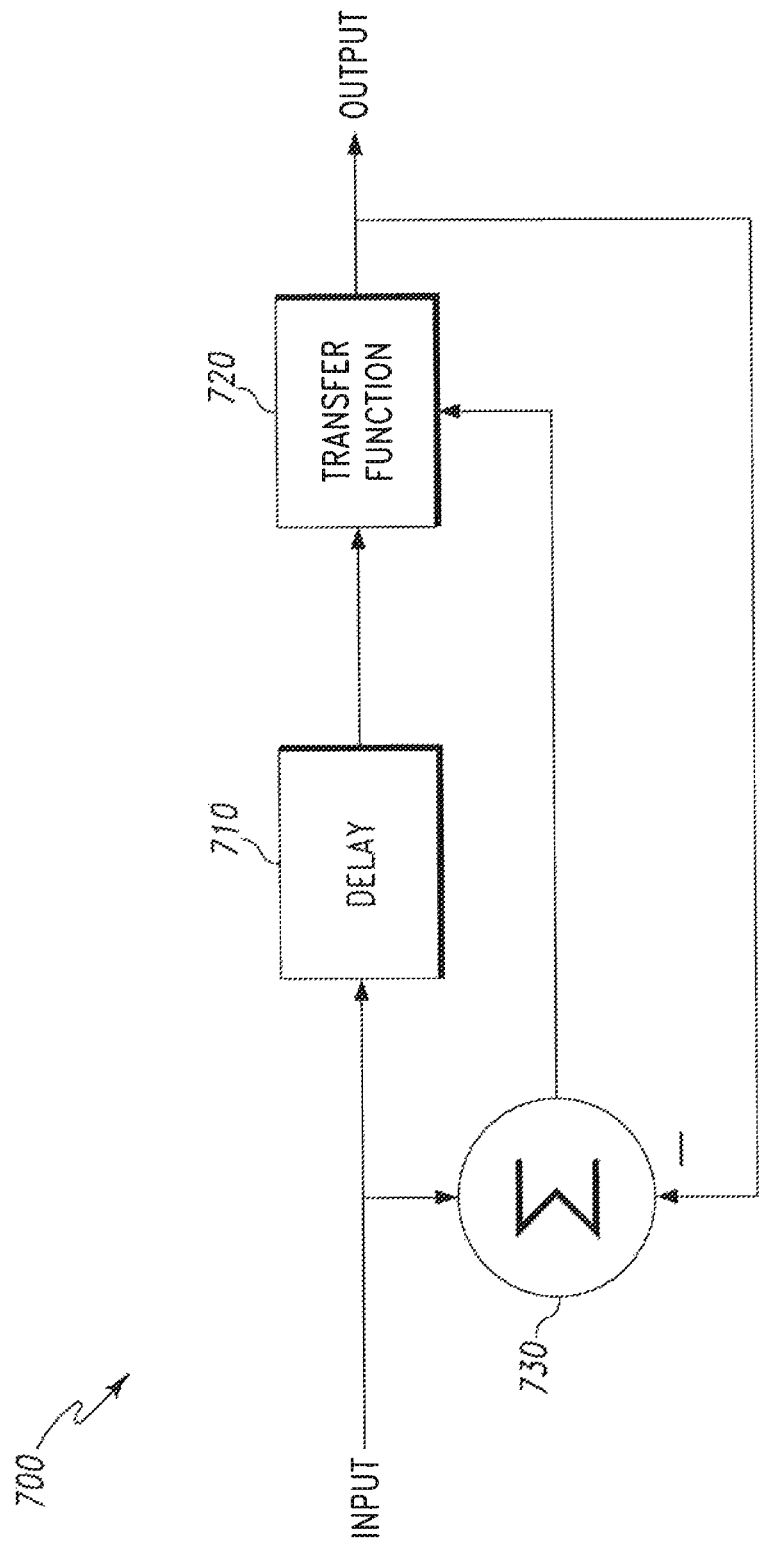
FIG. 7 is a block diagram of an embodiment of an adaptive line enhancement circuit used in a receiver of the present disclosure.

Turning now to FIG. 7, a block diagram of an embodiment of an ALE circuit 700 using aspects of the present disclosure is shown. ALE circuit 700 may be used as part of the ALE processing found in a detection and identification circuit, such as ALE 318 shown in FIG. 3. The input of ALE circuit 700 is connected to delay 710 and a first input of summer 730. Delay 710 is connected to transfer function block 720. The output of transfer function block 730 is connected to a second input of summer 470. The output of summer 730 is connected as a second input to transfer function block 720. The output of transfer function block 720 also provides the output signal for the ALE circuit 700.

An incoming signal, such as the band edge detected signal from either multiplier 312 or DC removal block 314 shown in FIG. 3, is provided to delay block 710. Delay block 710 delays the incoming signal by a programmable delay time based on a number of clock cycles. The programmable delay time allows for an adjustment in delay time prior to implementation of the ALE algorithm in order to de-correlate the incoming signal from the output signal of ALE algorithm. In a preferred embodiment, a delay time Δ equal to 10 clock cycles provides adequate decorrelation of the incoming signal with the ALE output signal.

The delayed signal from delay block 720 is provided to transfer function block 720. Transfer function block 720 implements the ALE algorithm using an adaptive transfer function. Transfer function 720 may implement a transfer function that is adaptable based on an error signal. The adaptive transfer function in transfer function block 720 can be described by the following Z-transform:

$$H(z) = \frac{\gamma^\Delta \cdot z}{z - r \cdot \gamma} \quad (1)$$

In equation (1), γ is an adaptation parameter controlling the operating frequency of the ALE algorithm, with $\gamma=|\gamma|e^{jw_0}$ and $w_0$ is the center angular frequency of the ALE algorithm. The value r is an adaptation parameter controlling the initial bandwidth of the ALE at the start of adaptation. The value Δ is the delay value that is also used in delay block 710. It is important to note that the transfer function in equation (1) may be implemented in hardware, in software or firmware as part of microprocessor, or in any combination within transfer function block 720.

The adaptation of the transfer function in equation proceeds iteratively and may be described by the following Matlab pseudo code:

$y(k)=y(k-1)*r*w(k)+xd(k)*w(k)^d$; % filter output;

$e(k)=x(k)-y(k)$; % error $a(k)=a(k-1)*r*w(k)+r*y(k-1)+xd(k)*d*w(k)^{(d-1)}$; % error derivative $phi(k)=v*phi(k-1)+(1-v)*abs(a(k))^2$; % average power $w(k+1)=w(k)+mu*e(k)*conj(a(k))/phi(k)$; % adapt. var. 'gamma';

In the above Matlab pseudo code, 'w' is γ used in equation (1), 'd' is Δ, 'e' is an error signal provided to the transfer function block 720, and 'v' and 'mu' are internal parameters. It is important to note that the Matlab pseudo code may be implemented in hardware, in software or firmware as part of microprocessor, or in any combination within transfer function block 720.

During each iteration through the adaptive ALE algorithm, the output of transfer function block 720 along with the incoming signal is provided to summer 730. The output from transfer function block 720 is negated, either through a sign inverter not shown or as a negative input of summer 730. Summer 730 implements a subtraction of the transfer function output from the incoming signal in order to produce an error signal at the output of summer 730. The error signal at the output of summer 730 is provided back to transfer function block 720 and is used as value 'e' in the adaptation process described above. The adaptation process in transfer function block 720 iteratively updates the adaptation variables γ and r to produce a new transfer function output value. Iterative operation of ALE 700 may also be further monitored for stability and convergence using additional circuit blocks, such as stability control block 320 and convergence monitor 322 shown in FIG. 3.

It is important to note that traditional ALE blocks typically operate using a delay value Δ equal to one. ALE algorithms based on a delay value of one allows the ALE to search and identify strong spectral lines primarily in the presence of white Gaussian noise. As described above, ALE 700 utilizes a programmable delay value. The programmable delay value allows ALE 700 to operate in the presence of a non-white (colored) noise environment. As described in FIG. 5, the pseudo-tone signal 510 is in the presence of a shaped spectrum as a result of the presence of the identified transponder and also due to the band edge filtering characteristics described earlier. As a result, the use of a programmable delay value in the ALE algorithm, such as described for ALE 700, may overcome the shortcoming found in traditional ALE algorithms.

Additionally, ALE 700 includes the characteristic that its operational bandwidth automatically narrows as it adapts. The narrowing allows the adaptation parameters γ and r to initially operate with a wider operating bandwidth. The wider initial bandwidth improves the chance that a sufficient amount of the pseudo-tone signal energy is within the passband of the ALE transfer function at its initial adaptation frequency location. As the adaptative transfer function in ALE 700 moves closer to, or zeroes in on, the pseudo-tone signal, the operational bandwidth automatically narrows, which results in improved accuracy and enhanced signal to noise ratio performance.

Figure 8:
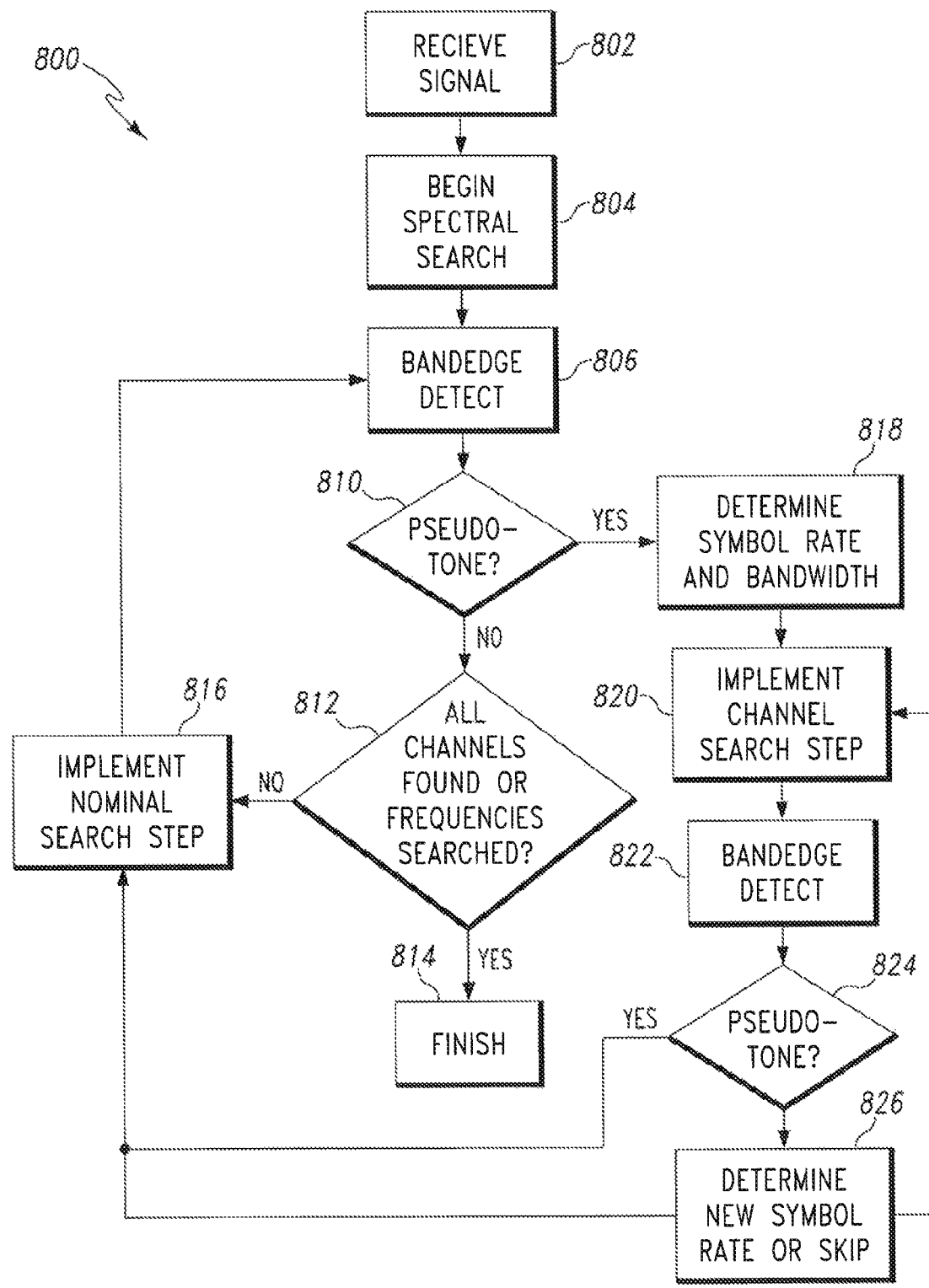
FIG. 8 is a flow chart of an embodiment of a process for determination and identification of a channel or transponder of the present disclosure.

Turning now to FIG. 8, a flow chart illustrating a process 800 for determining and identifying channels or transponders in a signal according to certain aspects of the present disclosure is shown. For purposes of example and explanation, the steps of process 800 will be described primarily with reference to signal identification circuit 300 in FIG. 3. The steps of process 800 may be carried out as part of an overall process associated with a receiver circuit, such as receiver 100 shown in FIG. 1. The steps of process 800 will be described with reference to transponders in a satellite signal but may equally apply to determining or identifying any other types of channels in a received signal. The steps of process 800 are exemplary only, and are not intended to limit the present disclosure in any manner.

First, at step 802, an incoming signal is received. The incoming signal may contain a digitized portion of the received signal spectrum. In a preferred embodiment, the incoming signal is the output signal from an A/D converter. Also at step 802, the incoming signal may also be pre-conditioned or pre-processed using circuitry such as the circuitry found in pre-processing block 302. Next, at step 804, a spectral search begins on the portion of the received signal. The spectral search begins by adjusting or frequency shifting the incoming signal to a first incremental frequency range. In a preferred embodiment, the first incremental frequency range frequency shifts the incoming signal to a starting lower frequency for the frequency range of the incoming signal. As a result, step 804 starts the spectrum search and detection by starting at the lower frequency edge of the signal spectrum of the incoming signal.

Next, at step 806, a band edge detection is performed on the frequency shifted spectrum. The band edge detection may include filtering the frequency shifted signal and combining it with a delayed and processed version of the incoming signal to produce an output signal. The output signal may contain a pseudo-tone signal if the band edge of a transponder has passed through the filtering during band edge detection. The band edge detection at step 806 may also include analysis of the band edge detected signal using either a spectrum based technique, an ALE based technique, or a combination of both.

At step 810, a determination is made as to whether a pseudo-tone signal has been generated following the band edge detection in step 806. If, at step 810, a pseudo-tone signal is detected in the frequency shifted spectrum, then its presence indicates that a first (e.g. lower or upper) transponder band edge has been detected and, at step 818, an analysis of the frequency location of the pseudo-tone signal is used to determine the numeric value of the symbol rate of the transponder. The analysis may use a spectral analysis based approach, such as the approach implemented in spectral analysis block 316. The analysis may also use an ALE based approach, such as the approach implemented in ALE 318. Additionally, based on the symbol rate, an estimate of the center frequency and bandwidth of the identified transponder as well as an estimate of the frequency position of the second (e.g. upper or lower) band edge of the identified transponder can be determined.

Following the determination of characteristics of the identified transponder, then at step 820, the frequency shifted signal is further frequency shifted using a channel frequency offset increment, or channel frequency step, based on the expected position of the upper band edge of the identified transponder. At step 822, a second band edge detection is performed on the further frequency shifted signal. The second band edge detection at step 822 is similar to the band edge detection at step 806. The second band edge detection may be used to verify the identification results obtained in step 810 or may be used to refine the results produced for the characteristics of the identified transponder in step 818.

Next, at step 824, a second determination is made, as to whether a second pseudo-tone signal has been generated following the second band edge detection in step 822. If a pseudo-tone signal is present at step 824, then the lower and upper band edges of the identified transponder have been located and further indicate that the proper characteristics have been determined in step 818. Then, at step 816, process 800 continues with a nominal incremental frequency step or frequency shift of the frequency shifted spectrum to begin the process of determining and identifying another transponder using band edge detection at step 806. The nominal frequency shift or frequency step at step 816 may typically be based on the passband bandwidth of the narrowband filter 306 in order to minimize problems with the band edge detection process. Step 816 may also include a re-tuning of a tuner, such as tuner 104 or tuner 106 shown in FIG. 1, to select a new portion of the received signal for band edge detection at step 806.

If, at step 824, the second pseudo-tone signal is not detected, then, at step 826, a further corrective step is taken. For example, at step 826, a second estimate for the channel frequency step may be generated based on further information relating to the symbol rate of the identified or other transponder characteristics. The new channel frequency step may be provided to frequency shift the originally shifted frequency spectrum at step 820, with process 800 continuing from that point. Additionally, at step 826, further identification and verification of the transponder may be skipped and process 800 continued at step 816 using the nominal frequency step. Still further, the identification and verification of the transponder may be completed using an alternate signal determination or identification process.

Returning to step 810, if the first pseudo-tone signal is not found, then at step 812, a determination is made as to whether all of the transponders present in the incoming signal have been found. Additionally, at step 812, a determination may be made as to whether the entire frequency range of the received signal has been searched or stepped through. The determination as to whether the entire frequency range has been search may include determining if the upper frequency edge of the signal spectrum of the incoming signal has been reached as a part of the frequency shifting steps. If, at step 812, the determination is positive, then, at step 814, the process 800 for determining and identifying transponders in the received signal is complete.

If, at step 812, the determination is negative, then at step 816, a nominal frequency step is provided to the spectral search, the signal is frequency shifted based on the nominal frequency step, and the process continues with band edge detection at step 806.

The embodiments in the present disclosure describe an apparatus and method for determining and identifying a transponder or channel in an incoming received signal containing a plurality of transponders or channels. The embodiments take advantage of a band edge detection technique to improve transponder or channel identification and may include additional processing for the determination of characteristics of an identified transponder or channel. The additional processing may include a spectral analysis based determination and identification approach or an adaptive line enhancement based determination or identification approach. In addition to improved transponder or channel identification, the additional processing permits increased the speed of searching the frequency spectrum of the received signal for transponders or channels by searching based on a channel frequency step size approximately equal to the bandwidth of an identified transponder when a transponder or channel is identified. The embodiments result in a faster and more accurate identification and determination of transponders or channels and lead to improved performance of a signal receiving device as well as an improved user experience.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the spirit and scope of the disclosure as defined by the following appended claims.

What is claimed is:

1. A method comprising the steps of:
receiving a signal containing a plurality of channels;
filtering the received signal, the step of filtering including using only one band edge filter;
determining if the filtered signal includes an indicator of a first band edge of a channel, the indicator being represented by a signal generated by processing the filtered received signal;
determining a characteristic of the channel based on the indicator of the band edge of the channel if the filtered signal includes the indicator, the characteristic being a symbol rate of the channel, the step of determining the characteristic further using adaptive line enhancement to determine the frequency location of the indicator of the first band edge of the channel with an output from the adaptive line enhancement used to determine the characteristic of the channel; and
estimating a frequency for the location of a second band edge of the channel using the frequency location of the indicator of the first band edge and the characteristic of the channel.

2. The method of claim 1, wherein the signal is generated by multiplying the filtered signal with the received signal.

3. The method of claim 1, wherein the step of determining includes using spectral analysis to determine the characteristic of the channel based on the indicator of the band edge.

4. The method of claim 3, wherein the spectral analysis is fast fourier transform analysis.

5. The method of claim 1, wherein the adaptive line enhancement uses an iteratively adaptive transfer function.

6. The method of claim 1, further comprising the step of shifting a frequency spectrum of the signal.

7. The method of claim 1, further comprising estimating a center frequency and bandwidth of the channel based on the symbol rate.

8. The method of claim 7, further comprising shifting the frequency spectrum of the received signal by a predetermined step size to identify a band edge of at least one second channel.

9. The method of claim 8, wherein the predetermined step size is approximately equal to the bandwidth of the channel.

10. An apparatus comprising:
a spectrum shift circuit that receives an input signal containing a plurality channels and shifts the frequency spectrum of the input signal;
a single band edge filter coupled to the spectrum shift circuit that filters the frequency shifted signal;
a multiplier circuit coupled to the single band edge filter, the multiplier circuit generating a signal representing an indicator of a first band edge of a channel if the single band edge filter contains the first band edge; and
a signal analysis circuit coupled to the multiplier circuit, the signal analysis circuit using adaptive line enhancement to determine the frequency location of the indicator of the first band edge of the channel with an output from the adaptive line enhancement used to determine a characteristic of the channel, the determined characteristic being a symbol rate of the channel, the signal analysis circuit further controlling the frequency shift in the spectrum shift circuit to estimate a frequency for the location of a second band edge of the channel based on the frequency location of the indicator of the first band edge and the determined characteristic of the channel.

11. The apparatus of claim 10, wherein the signal analysis circuit includes a spectral analysis circuit.

12. The apparatus of claim 11, wherein the spectral analysis circuit includes a fast fourier transform.

13. The apparatus of claim 10, wherein the adaptive line enhancement circuit includes an iteratively adaptive transfer function.

14. The apparatus of claim 10, wherein the signal analysis circuit estimates a center frequency and bandwidth of the channel based on the symbol rate.

15. The apparatus of claim 14, wherein the signal analysis circuit controls the frequency shift in the spectrum shift circuit by a predetermined step size to identify a band edge of at least one second channel.

16. The apparatus of claim 15, wherein the predetermined step size is approximately equal to the bandwidth of the channel.

* * * * *